UNITED STATES PATENT OFFICE.

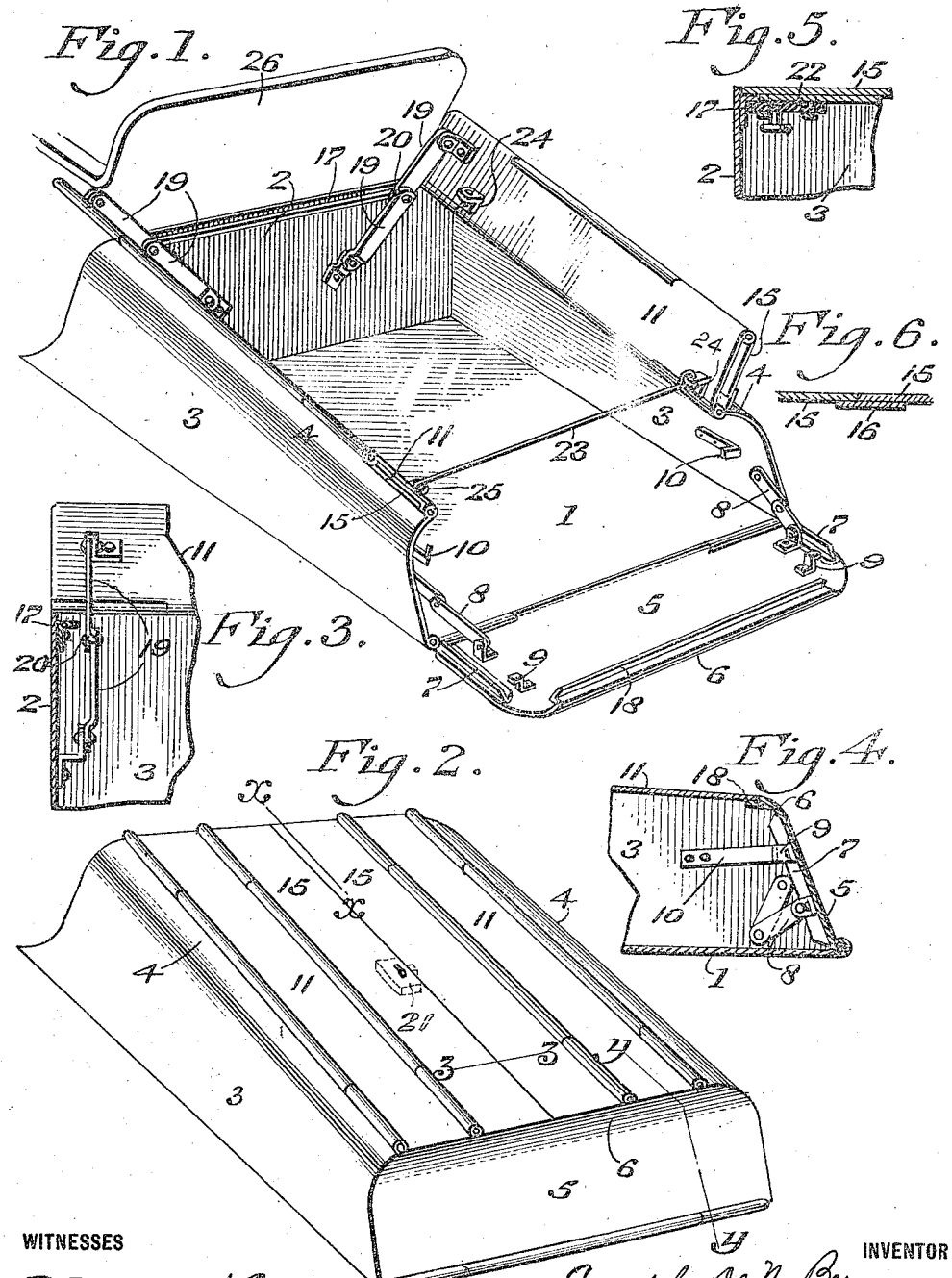
J. DE N. BERRYMAN.
BODY FOR AUTOMOBILES.
APPLICATION FILED DEC. 16, 1914.
1,136,643.
Patented Apr. 20, 1915.

JOSEPH DE N. BERRYMAN, OF PHILADELPHIA, PENNSYLVANIA.

BODY FOR AUTOMOBILES.

1,136,643.  Specification of Letters Patent.  Patented Apr. 20, 1915.

Application filed December 16, 1914. Serial No. 877,476.

*To all whom it may concern:*

Be it known that I, JOSEPH DE N. BERRYMAN, a citizen of the United States, residing in the city and county of Philadelphia, State of Pennsylvania, have invented a new and useful Body for Automobiles, of which the following is a specification.

My invention consists of a body for an automobile or other vehicle which can be opened to serve as a load-carrying receptacle or closed to appear as an ordinary one-seated run-about or the so-called "streamline" type body.

It further consists of such a body which, when folded and closed, will have an attractive appearance and will not appear as a freight or baggage carrier, and, when opened and unfolded, will provide a proportionately large receptacle for containing goods and packages of various kinds.

It further consists of other novel features of construction, all as will be hereinafter fully set forth.

The annexed drawings and the following description set forth in detail one mechanical form embodying my invention, such detail construction being but one of various mechanical forms in which the principle of the invention may be used.

In said annexed drawings—Figure 1 represents a perspective view of a vehicle body embodying my invention and illustrating the same adapted for carrying freight. Fig. 2 represents a perspective view of said body, closed. Fig. 3 represents a detail sectional view, taken on the line $x$—$x$ in Fig. 2. Fig. 4 represents a detail sectional view of the tail-board and face view of one-side wall of the body, on the line $y$—$y$, Fig. 2. Fig. 5 represents a detail sectional view of the front end of the body and of the folding top of the same, illustrating a fastener for such top. Fig. 6 represents a detail sectional view of the edges of the cover-leaves on the line $z$—$z$ Fig. 2.

Similar numerals of reference indicate corresponding parts in the figures.

Referring to the drawings, the reference numeral 1 indicates the floor of the box or body which is of any preferred or required shape to be supported upon the chassis of the automobile or frame of other vehicle. A front-wall, 2, is secured upon the forward end of the floor, and side-walls, 3, are secured with their lower edges to the side-edges of the floor and the forward edges to the front-wall. The upper portions, 4, of the side-walls are longitudinally and inwardly curved, and the rear edges of said walls are inwardly inclined to have the end edges of a tail-board, 5, formed with an inwardly curved upper portion, 6, fit on said rear edges. Said tail-board has its lower edge hinged upon the rear edge of the bottom of the body, and can be swung up with its ends bearing upon the curved rear edges of the side-walls to form curved corner-joints. Flanges, 7, are formed upon the inner side of the tail-board at its ends to engage within the rear ends of the side walls. Pairs of flat links, 8, are hinged together at their meeting ends and pivotally connected to the tail-board and the ends of the side walls to support the tail-board when the latter is folded out. Hooks, 9, project from the inner face of the tail-board near the ends of the same, and are engaged by spring-catches, 10, upon the side-walls when the tail-board is closed.

Two leaves, 11, are hinged on the upper edges of the side-walls, and said leaves have inner leaves, 15, hinged to their edges and, when folded down to close the open top of the body, the edge of one of said leaves meets the edge of the other leaf and rests upon a rabbet or flange, 16, upon the same to form a tight joint, the outer face of which is flush. The front wall of the body has a flange, 17, upon its inner face and at its upper edge, upon which the forward edges of the cover-leaves rest when folded down to close the open top of the body. The upper edge of the hinged tail-board is formed with a seat or rabbet, 18, in which the rear edges of the cover-leaves are supported when the latter are folded down to close the body. A pair of flat brace-links, 19, have their meeting ends hinged together and have their other ends pivotally connected respectively to the front-wall of the body and to the outer leaves, so that such braces can retain the leaves in their raised and outwardly inclined positions. Catches, 20, one at the hinge-end of one of each pair of said links, engage the adjoining link to hold the same in extended position and the leaves in open position. A lock, 21, is secured in the free edge of one of the inner cover-leaves to engage and lock the free edge of the other leaf, and said latter leaf has a locking-bolt, 22, at the forward edge, which can engage the flange 17 upon the front-wall of the body and hold the same in its closed position.

A long-shanked hook, 23, is movably supported at the rear edge of one of the outer leaves and engages an eye, 24, upon such leaf when the cover is closed, and when the cover-leaves are opened, as shown in Fig. 1, such hook engages an eye, 25, upon the opposite outer leaf and braces the leaves in their open positions.

When the body is not in use, the driver occupies the seat, 26, and the cover-leaves are folded over the top of the body to have their meeting edges fitted and locked, the one inner leaf locked by its bolt to the front wall, and the ends of the leaves respectively resting upon the flanges upon the front-wall and the rabbet in the edge of the tail-gate. The joints between the leaves and between said leaves and the end closures of the body are level and covered by having depressed seats or rabbets, so that such joints will be tight. The lock, bolt and spring catches and hooks will secure the elements to form a closed low box. When the body is to be used for containing articles of freight or other load, the lock is opened, and one pair of leaves folded and swung upwardly and inclined outwardly. The bolt upon the other pair of leaves is released from the flange upon the front-wall so that said leaves can be folded and swung upwardly and outwardly inclined. The hinged links are straightened and thus brace the front ends of the leaves in their opened positions, as illustrated in Fig. 1. The long hook is unhooked from the eye upon the leaf and swung transversely to secure the rear ends of the cover-leaves by the hook engaging the eye upon the opposite leaf. The spring catches are released from the hooks upon the tail-gate and the latter is tilted out to be supported by the hinged links. The open body can now be loaded with articles capable of being stowed and held in the body.

The body can thus be closed and the vehicle will have the appearance of an automobile for passengers, with the seat, only, in use, and such body can be opened and be suitably loaded, the seat being in service for the driver and passenger.

In vehicle bodies as heretofore constructed, especially in vehicles such as automobiles, it has been deemed necessary when it is desired to employ a pleasure or passenger car to transport goods, to remove the seat or the passenger body or tonneau from the vehicle and replace the same with a body especially constructed to receive goods or merchandise. Such change not only causes great trouble and annoyance and loss of time but, furthermore, it largely increases the expense to the owner, since it is necessary to have on hand two different types of vehicle bodies, one for the carrying of passengers, and the other for the carrying of merchandise, only one of which is in use at the same time. In my present invention, I have overcome this necessity of the changing of the bodies or purchasing a separate vehicle body, since I have devised a body which may be readily converted, without any change whatever or any additions, from a passenger or pleasure car to a body adapted to receive merchandise of any nature desired.

Other modes of applying the principle of the invention may be employed for the mode herein explained. Change may therefore be made as regards the mechanism thus disclosed, provided the principles of construction set forth, respectively, in the following claims are employed.

Having thus described my invention, what I claim as new and desire to secure by Letters Patent is:—

1. A vehicle body, comprising a box adapted to be supported upon a chassis or vehicle frame, and having a bottom and a front wall and side-walls, a tail-gate hinged to the rear edge of the bottom, hinged links pivoted to said tail-gate and the rear ends of said side-walls, spring catches upon the rear portions of the side-walls and upon the tail-gate to detachably engage when the gate is closed, cover-leaves hinged to the upper edges of the side-walls, cover-leaves hinged to the edges of said former leaves, and hinged braces movably connected to the outer cover-leaves and to the front wall of the box.

2. An automobile body, comprising a seat and a box adapted to be supported upon a chassis or vehicle frame, and having a front-wall and having the upper portions of its side-walls curved inwardly, a tail-gate hinged to the rear edge of the bottom of said box and having its upper portion curved inwardly, hinged links pivoted to said tail-gate and to the side-walls, cover-leaves hinged to the upper edges of the side-walls, cover-leaves hinged to the edges of said former leaves, means for locking said leaves together, and hinged braces movably connected to the outer cover-leaves and the front wall of the box.

JOSEPH DE N. BERRYMAN.

Witnesses:
C. D. McVay,
H. S. Fairbanks.